United States Patent
Alaniz

(10) Patent No.: US 6,186,533 B1
(45) Date of Patent: Feb. 13, 2001

(54) MONOTUBULAR CHASSIS FOR TRAILERS

(75) Inventor: Fabian Alaniz, Cba. (AR)

(73) Assignee: Cormetal of USA, Inc., Miami, FL (US)

( * ) Notice: Under 35 U.S.C. 154(b), the term of this patent shall be extended for 0 days.

(21) Appl. No.: 09/494,052

(22) Filed: Jan. 28, 2000

(51) Int. Cl.[7] .......................... B62D 21/04; B62D 21/14; B62D 21/20

(52) U.S. Cl. .................... 280/656; 280/786; 280/789; 280/798

(58) Field of Search .................. 280/656, 786, 280/789, 796, 797, 798, 404

(56) References Cited

U.S. PATENT DOCUMENTS

| | | | |
|---|---|---|---|
| 2,113,399 | * 4/1938 | Dietrich | 280/797 |
| 2,152,804 | * 4/1939 | Hays | 280/796 |
| 2,329,408 | 9/1943 | Minium . | |
| 2,344,378 | * 3/1944 | Wagner | 280/796 |
| 4,566,714 | * 1/1986 | De Witt et al. | 280/656 |

* cited by examiner

*Primary Examiner*—Peter C. English
(74) *Attorney, Agent, or Firm*—J. Sanchelima

(57) ABSTRACT

An integral frame structure for vehicles that includes a telescopically extending tubular member with rear and front support assemblies mounted perpendicularly to the ends. Transverse cross members are perpendicularly mounted to the longitudinally extending tubular member. The tubular member has a relatively large diameter with respect to the transverse cross members that are kept in perpendicular position with respect to the tubular member defining a plane below the longitudinal upper portion of the tubular member. A load is supported by the front and rear support assemblies as well as the cross assemblies. The load is also supported by the upper longitudinal portion of the tubular member, specially, the portion adjacent to the rear portion. The structure is easily assembled and capable of being stored in a volumetrically efficient manner.

5 Claims, 3 Drawing Sheets

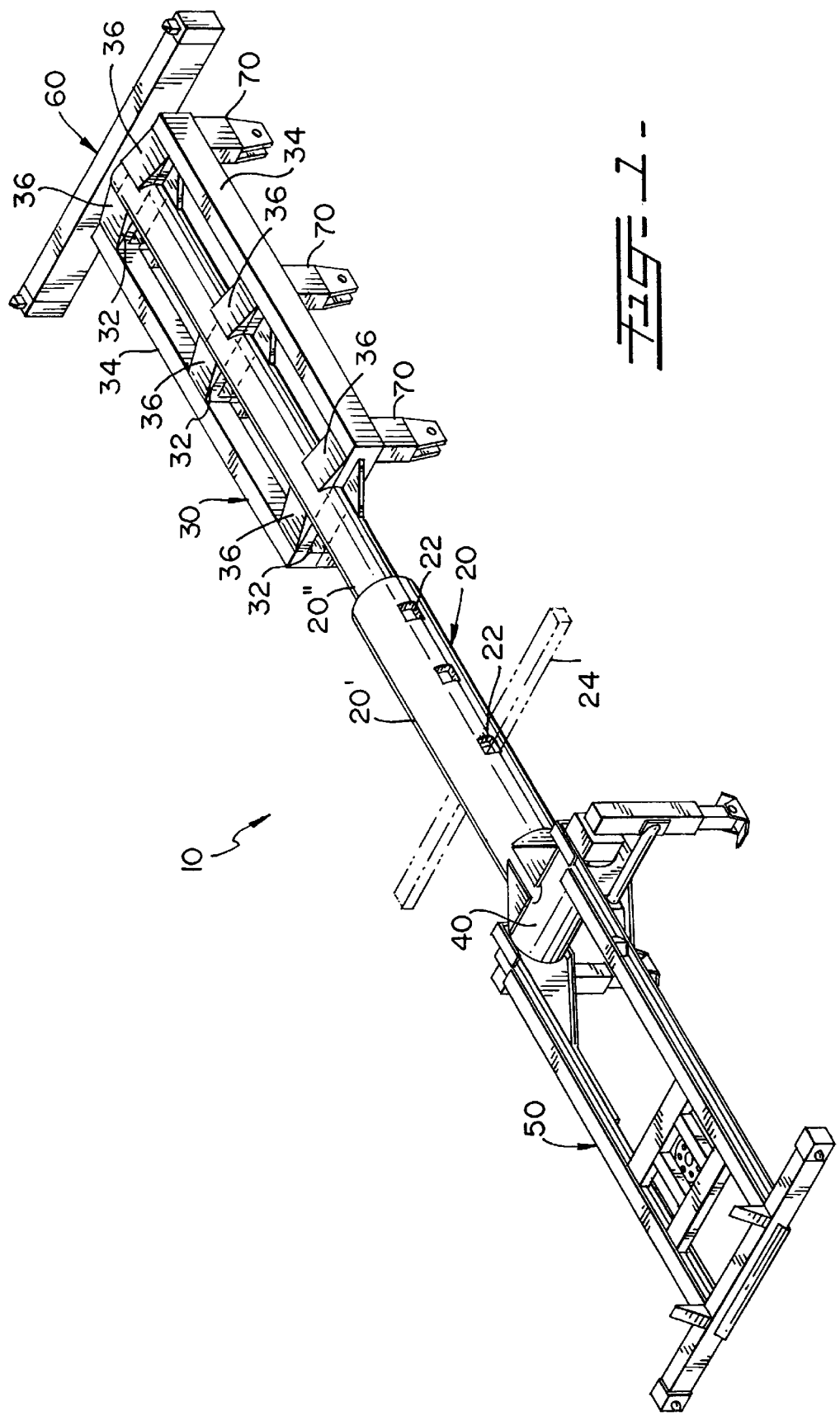

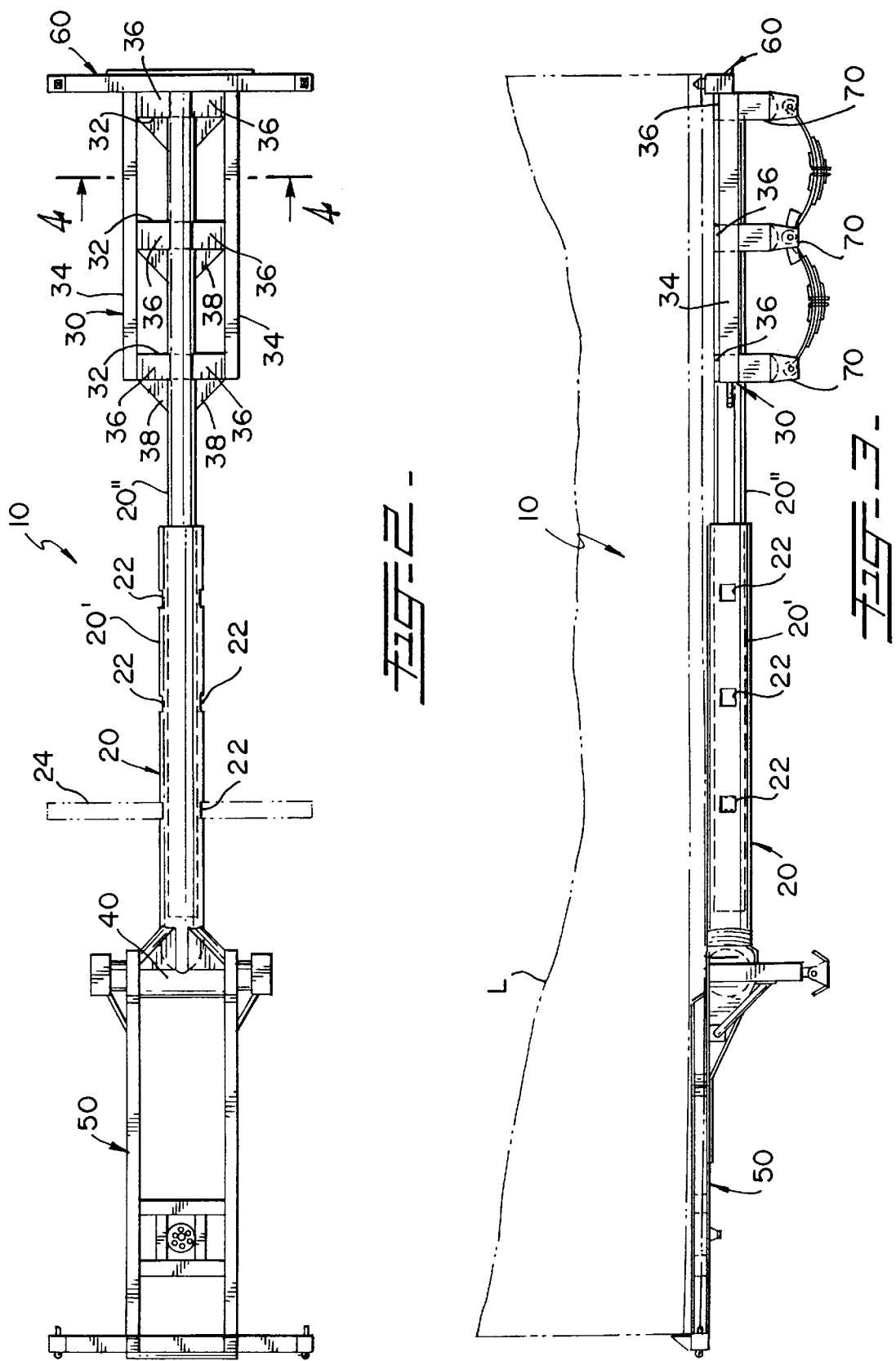

MONOTUBULAR CHASSIS FOR TRAILERS

II. BACKGROUND OF THE INVENTION

1. Field of the Invention

The present invention relates to monotubular chassis for trailers, and more particularly, to those used as a traction as well as a load supporting member.

2. Description of the Related Art

Many designs for vehicles' chassis or frame structures have been designed in the past. None of them, however, include a monotubular longitudinal member with a sufficiently large diameter to receive and support transverse handles without requiring any other member to keep the chassis structure substantially horizontal.

Applicant believes that the closest reference corresponds to U.S. Pat. No. 2,329,408 issued to George S. Minium (1943) for TRAILER TRUCK FRAME. The patented invention has only one tubular longitudinal member. However, the diameter is not large enough to support cross members passing therethrough. Minium's patent utilizes longitudinal beams 41; 42 and 43 that are not required in the present invention.

Other patents describing the closest subject matter provide for a number of more or less complicated features that fail to solve the problem in an efficient and economical way. None of these patents suggest the novel features of the present invention.

III. SUMMARY OF THE INVENTION

It is one of the main objects of the present invention to provide a monotubular chassis or frame structure that supports structural cross members mounted perpendicularly therethrough and not requiring additional longitudinal members.

It is another object of this invention to provide a monotubular frame chassis that minimizes the weight of the resulting structure and maximizes the cargo to structure weight ratio.

It is still another object of the present invention to provide a sturdy monotubular chassis with minimum number of parts thus optimizing manufacturing costs and inventory logistics.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 is an isometric view of the monotubular chassis.

FIG. 2 represents a top plan view of the monotubular chassis.

FIG. 3 shows a side elevational view of the chassis shown in FIG. 1.

V. DETAILED DESCRIPTION OF THE PREFERRED EMBODIMENT

Figure 4:
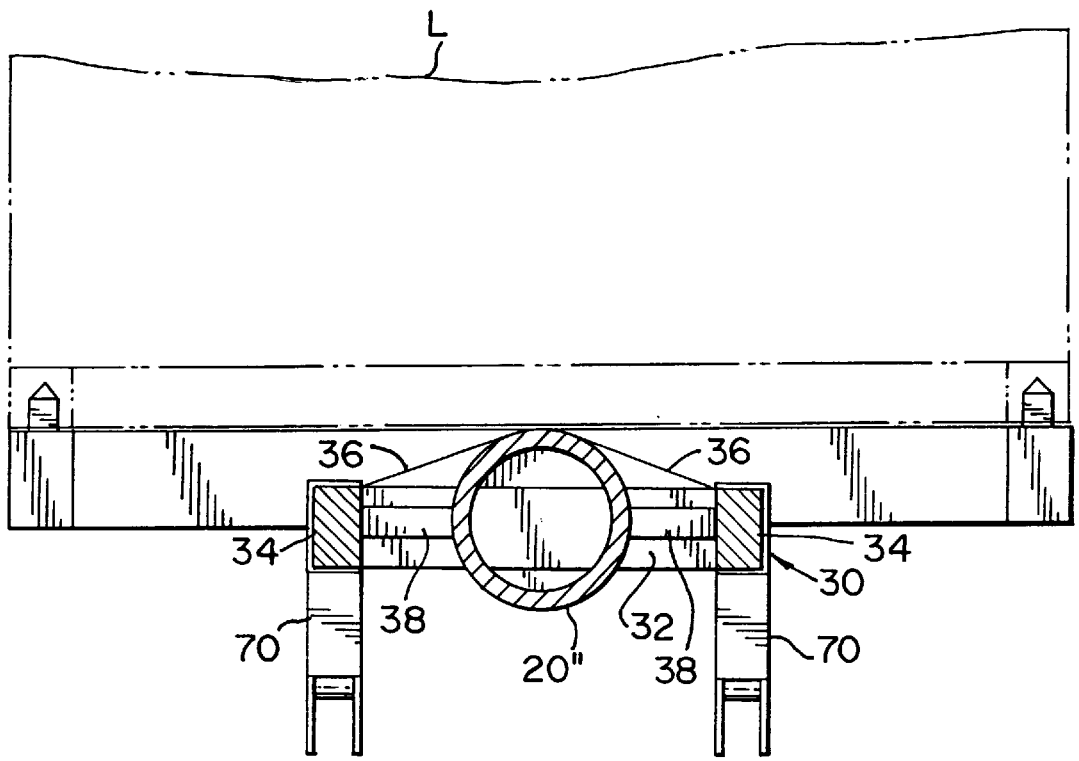
FIG. 4 illustrates a cross sectional view of the chassis taken along line 4—4 in FIG. 2.
Figure 5:
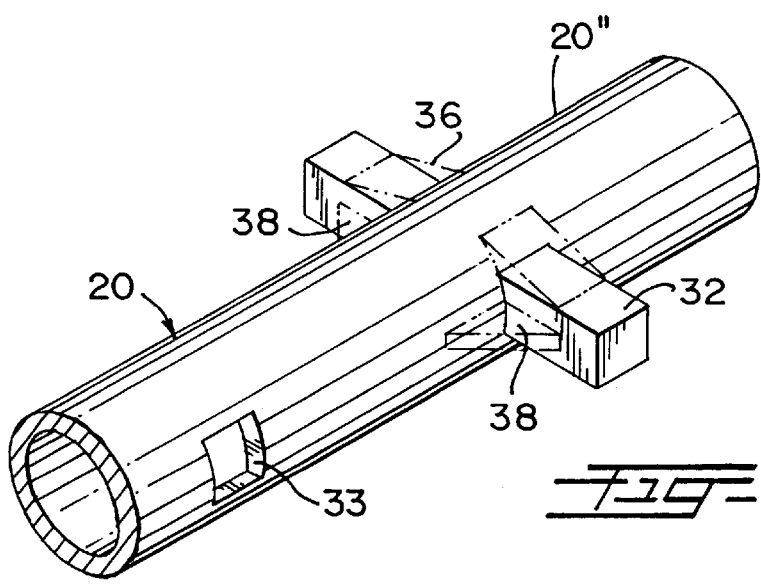
FIG. 5 is a partial isometric view of the longitudinal tubular assembly with transverse locking members mounted therethrough.

Referring now to the drawings, where the present invention is generally referred to with numeral 10, it can be observed that it basically includes longitudinal tubular assembly 20 that extends from one end to the other of chassis 10. Support assembly 30 includes several transverse cross members 32. Tubular assembly 20 has a relatively large diameter and permits transverse cross members 32 to go through. Tubular assembly 20 includes front and rear sections 20' and 20" that are telescopically disposed. The front end includes front cross tubular assembly 40 perpendicularly mounted to the front end of tubular assembly 20. Electrical cables and hydraulic conduits are passed through tubular assembly 20.

As shown in FIG. 1, chassis 10 has front cross tubular assembly 40 mounted perpendicularly thereon and includes support assembly 50 forward of front cross tubular assembly 40. Rear cross tubular assembly 60 is perpendicularly mounted to the other end of tubular assembly 20. The load L in a typical chassis is carried by support assembly 50, rear cross tubular assembly 60, and the upper portion of tubular assembly 20 adjacent to assembly 60. Section 20" has, in the preferred embodiment, several transverse cross members 32 that are commonly connected through lateral support members 34 that transmit the load to the wheels (not shown) through support members 70.

Tubular assembly 20 includes transverse openings 22 in front portion 20' at predetermined distances along tubular assembly 20. The overall length of assembly 20 can thus be readily adjusted with transverse bar members 24. One of the advantages of the present invention is the use of components that are relatively simple and easy to assembly, store and transport.

The transverse cross members 32 are mounted perpendicularly to tubular assembly 20 through cooperative transverse apertures 33, and locked in place with rigidly mounted locking members 36 and 38. A horizontal plane is defined by cross members 32, which are commonly connected by lateral support members 34. In this manner, a load L can be horizontally supported by frame assembly 50, rear cross tubular assembly 60 and the longitudinal upper end of tubular assembly 20, as best seen in FIG. 3. Preferably, most of the load is applied to the one half portion adjacent to assembly 60 since the other half is more structurally vulnerable.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An integral frame structure for vehicles, comprising:
   A) a longitudinally extending tubular member having first and second ends, and further including a plurality of transverse apertures, said tubular member including a longitudinally extending upper portion;
   B) a front support assembly mounted perpendicularly to said first end;
   C) a rear support assembly mounted perpendicularly to said second end;

D) a plurality of transverse cross members each having third and fourth ends, said transverse cross members having a diameter smaller than the diameter of said tubular member and mounted perpendicularly to said tubular member and said transverse cross members passing through said transverse apertures so that a horizontal plane is defined by said transverse cross members that is kept at a spaced apart relationship with respect to said longitudinally extending upper portion;

E) first and second lateral support members commonly connected to said third and fourth ends, respectively; and F) a plurality of locking members rigidly connected to said first and second lateral support members.

2. The structure set forth in claim 1 wherein a load is supported by said front and rear support assemblies and said upper portion of said tubular member.

3. The structure set forth in claim 2 wherein said load is supported by said upper portion adjacent to said rear support assembly.

4. The structure set forth in claim 3 wherein said load is supported by said upper portion that extends up to one half the length of said tubular member.

5. The structure set forth in claim 4 wherein said tubular member includes two adjustable telescopically joined sections.

* * * * *